3,208,982
TERPOLYMER OF PROPYLENE, CONJUGATED DIENE AND ANOTHER 1-OLEFIN OF 4 TO 6 CARBON ATOMS
Charles T. Davis, Fayetteville, Ark., assignor to Phillips Petroleum Company, a corporation of Delaware
No Drawing. Filed Mar. 13, 1959, Ser. No. 799,091
9 Claims. (Cl. 260—80.7)

This invention relates to novel terpolymers of certain selected olefins. In one aspect, it relates to the preparation of novel terpolymers which are particularly suitable for use as pressure-sensitive adhesives.

In recent years, plastics have played an increasingly important role in the tape industry. Of the various types of adhesive tapes produced by the industry, plastics have found their most important application in the manufacture of pressure-sensitive adhesive tape. The use of plastics as a backing material has resulted in the acceptance of pressure-sensitive adhesive tape as an important industrial tool. In general, a pressure-sensitive adhesive tape is composed of two principal components, namely, the backing material and a suitable adhesive coating applied to one surface of the backing. In many instances, a prime layer or key coat is used to anchor the adhesive to the backing film. The present invention is concerned with novel terpolymers which are particularly suitable for use as pressure-sensitive adhesives. It has been found that the terpolymers of this invention readily adhere to any of the backing materials conventionally used in preparing tapes without the aid of a primer layer or key coat. Furthermore, tape prepared with the terpolymer of this invention as the adhesive coating forms a very strong bond when applied to various types of surfaces such as wood, metal, glass or paper surfaces. While the terpolymers of this invention are particularly suitable for use in preparing pressure-sensitive adhesive tape, the terpolymers can be advantageously employed in many other applications as will subsequently become apparent.

It is an object of this invention to provide a novel terpolymer which is particularly suitable for use as a pressure-sensitive adhesive.

Another object of the invention is to provide a process for preparing novel terpolymers of certain selected monomers.

Other and further objects and advantages of the invention will become apparent to those skilled in the art upon consideration of the accompanying disclosure.

The instant invention resides in the discovery of a process for producing novel terpolymers which are particularly suitable for use as pressure-sensitive adhesives. Broadly speaking, the process comprises polymerizing an olefinic mixture comprising 35 to 55 parts by weight of propylene, 35 to 55 parts by weight of a straight chain 1-olefin containing from 4 to 6, inclusive, carbon atoms per molecule, and 5 to 15 parts by weight of a conjugated diene selected from the group consisting of 1,3-butadiene, isoprene and 1,3-pentadiene (piperylene), in the presence of a catalyst comprising a trialkylaluminum and titanium tetrachloride. The terpolymers prepared in accordance with this process are very tacky at room temperature and adhere tenaciously to various types of surfaces. As a result, the terpolymers of this invention find numerous applications in the field of pressure-sensitive adhesives. However, if products of the desired tackiness are to be obtained, it has been found to be essential that the quantities of each of the components of the olefinic mixture to be polymerized be controlled within the relatively narrow limits set forth above.

As mentioned hereinbefore, propylene is one of the essential components in the mixture of olefins to be polymerized. It is employed in an amount in the range of 35 to 55 parts by weight per 100 parts of the total olefins used in the polymerization. Another of the components is a straight chain 1-olefin which contains 4, 5, or 6 carbon atoms per molecule, i.e., 1-butene, 1-pentene, or 1-hexene. The amount of this 1-olefin employed in the monomeric mixture is in the range of 35 to 55 parts by weight per 100 parts by weight of the total monomer charge. The remaining component in the olefinic mixture to be polymerized is a conjugated diene selected from the group consisting of 1,3-butadiene, isoprene and 1,3-pentadiene. The amount of the conjugated diene which is employed can range from 5 to 15 parts by weight per 100 parts of the total monomer charge. It is to be understood that in carrying out the process of this invention, the quantities of the several monomers contained in the olefinic mixture to be polymerized are adjusted so as to give 100 parts of material. A mixture of the 1-olefins and/or a mixture of the conjugated dienes can also be employed, the total amount of monomers in each mixture being in the aforementioned ranges.

The polymerization of the above-described olefinic mixture is carried out in the presence of a trialkylaluminum-titanium tetrachloride catalyst system. The trialkylaluminum used in this system corresponds to the formula $R_3Al$, wherein R is an alkyl radical containing from 1 to 12, inclusive, preferably from 3 to 12, carbon atoms. It is to be understood that the expression "alkyl radical" includes both straight and branched chain alkyl groups, such as methyl, ethyl, propyl, isopropyl, n-butyl, tert-butyl, amyl, hexyl, octyl, decyl and dodecyl. Furthermore, it is to be understood that the alkyl radicals in the aforementioned general formula can be the same or different. Thus, it is within the scope of the invention to utilize in the catalyst system a trialkylaluminum such as ethyldiisobutylaluminum. It is usually preferred that each of the alkyl groups contains at least 3 carbon atoms since catalyst systems containing such compounds have been found to have a high activity when employed in the preparation of the terpolymers of this invention. A preferred catalyst system for use in the practice of the present process is one comprising triisobutylaluminum and titanium tetrachloride.

The amount of the organoaluminum compound corresponding to the formula $R_3Al$ used in the catalyst composition is usually in the range of 0.8 to 3 mols, preferably 0.8 to 2 mols, per mol of titanium tetrachloride. When employing catalyst systems having compositions falling within the aforementioned range to polymerize mixtures of monomers as hereinbefore mentioned, terpolymers having unusual tackiness and other characteristics which render them particularly adaptable for pressure-sensitive adhesive applications are readily obtained. The amount of the catalyst composition which is used in preparing the terpolymers can vary over a rather broad range. The catalyst composition is generally used in quantities which contain from 3 to 30 millimoles of the trialkylaluminum per 100 grams of monomers, preferably from 6 to 20 millimoles of the aluminum compound per 100 grams of monomers.

The polymerization process of this invention is preferably carried out in the presence of a diluent. Diluents suitable for use in the process are hydrocarbons which are not detrimental to the polymerization reaction. Suitable diluents include aromatics, such as benzene, toluene, xylene, ethylbenzene and mixtures thereof. It is also within the scope of the invention to use straight and branched chain paraffins, preferably those containing up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of the paraffinic hydrocarbons can also be employed as diluents in the practice of this invention. Cycloparaffins, such as cyclohexane and methylcyclohexane, can also be used. Furthermore, mixtures of any of the aforementioned hydrocarbons can be used as diluents.

The polymerization process of this invention can be carried out at any temperature within the range of zero to 150° C. It is usually preferred that the polymerization be effected at a temperature between 25 and 100° C. The polymerization reaction can be carried out under autogenous pressure or any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction.

The process of this invention can be carried out as a batch process by charging the monomers to be polymerized into a reactor containing catalyst and diluent. Although any suitable charging procedure can be used, it is usually preferred to add the catalyst components to a reactor containing diluent and thereafter introduce the mixture of olefins to be polymerized. It is also within the scope of the invention to preform the catalyst by reacting the catalyst components in a separate catalyst preparation vessel. The process can also be carried out continuously by maintaining the abovementioned concentrations of reactants in the reactor for a suitable residence time. The residence time in a continuous process will, of course, vary within rather wide limits depending upon such variables, as temperature, pressure, the ratio of catalyst components, and the catalyst concentration. In a continuous process, the residence time will generally fall within the range of 1 second to 1 hour or longer. When a batch process is being utilized, the time for the reaction can be as high as 24 hours or more.

Various materials are known to be detrimental to the catalyst composition of this invention. These materials include carbon dioxide, oxygen and water. It is highly desirable, therefore, that the monomers be freed of these materials as well as other materials which tend to inactivate the catalyst. Any of the known means for removing such contaminants can be used. Also, when a diluent is employed in the process, it is preferred that this material be substantially free of impurities, such as water, oxygen and the like. In this connection, it is desirable to remove air and moisture from the reaction vessel in which the polymerization is conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated in the reaction mixture is insufficient to cause complete deactivation of the catalyst.

After completion of the polymerization reaction, when a batch process is used, the total reaction mixture is then treated to inactivate the catalyst and cause precipitation of the polymer. The polymer is then separated from the alcohol and water or diluent by any suitable means such as decantation or filtration. It is often preferred to add initially a catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst-inactivating agent and the antioxidant, the polymer present in the solution can then be separated by the addition of an excess of a material such as ethyl alcohol or isopropyl alcohol. When the process of the invention is carried out continuously, the total effluent from the reactor can be pumped from the reactor to a catalyst-inactivating zone wherein the reactor effluent is contacted with a suitable catalyst-inactivating material such as an alcohol. When an alcohol is used as a catalyst-inactivating material it also functions to precipitate the polymer. It is, of course, to be realized that it is within the scope of the invention to employ any other suitable means to recover the polymer from solution. After separation from the diluent and treating agents by filtration or other suitable means, the polymer is dried.

As discussed hereinbefore, the terpolymers of this invention are particularly suitable for use as pressure-sensitive adhesives. For example, in the manufacture of pressure-sensitive adhesive tape, the terpolymers can serve as the adhesive component which is applied to various types of backing materials, e.g., polyvinylchloride, polyvinylacetate, polyethylene, chlorinated polyethylene, and the like. The terpolymer can be conveniently applied to the backing material as a solution in a suitable solvent such as the hydrocarbon diluents listed hereinbefore. Another application of the terpolymer adhesives is their use for self-sealing containers which can be employed as shipping or storage cartons. The terpolymer adhesive can be applied, for example, to the surface of the opening to be closed, and sealing can be effected when desired merely by bringing the surface of a closure member into contact with the adhesive and exerting pressure.

In addition to the foregoing applications, the terpolymers of this invention have many other important uses. Thus, the terpolymers can be compounded with curatives, which are sufficiently active to cause the composition to increase in stiffness and to finally become quite firm upon prolonged standing. Curing agents such as those used in curing synthetic rubber, e.g., peroxides, such as dicumyl peroxide, and sulfur systems, can be used in compounding the terpolymers. Such compositions can be used for the installation of floor tile and wall tile and for securing asbestos-type shingles in place. The terpolymers per se possess the requisite amount of tackiness to secure various types of installations such as those already mentioned, and the durability of such installations is increased by the gradual curing of the terpolymers. For these latter uses, such curatives as are employed are usually blended with the terpolymer adhesives immediately prior to their application.

A more comprehensive understanding of the invention can be obtained by referring to the following illustrative example which is not intended, however, to be unduly limitative of the invention.

EXAMPLE

A run was carried out in which a terpolymer according to this invention was prepared by polymerizing propylene, 1-butene and 1,3-butadiene. The following polymerization recipe was employed in this run:

| | Parts by weight |
|---|---|
| Propylene | 45 |
| 1-butene | 45 |
| Butadiene | 10 |
| n-Heptane | 684 |
| Tributylaluminum (TBA) (14 mmoles) | 2.78 |
| Titanium tetrachloride (TTC) (11.7 mmoles) | 2.22 |
| Mol ratio, TBA/TTC | 1.2/1 |
| Temperature, ° C. | 80 |
| Time, hours | 16 |
| Conversion, percent | 47 |

The polymerization was carried out in an atmosphere of prepurified nitrogen, using a 1-gallon reactor provided with a stirrer. The catalyst, which consisted of tributylaluminum and titanium tetrachloride, was preformed in a beverage bottle at room temperature and then transferred directly into the reactor from the bottle. The tributylaluminum was in solution in mineral oil which had been heated to about 116° C. and purged with prepurified nitrogen until cooled in order to remove water and oxygen. The titanium tetrachloride was used as a solution in cyclohexane. The concentration was about 1.0 molar.

The monomers used in the polymerization were purified and collected in a stainless steel bomb just prior to charging to the reactor. The butadiene, which was flashed from an inhibitor, was collected at —78° C. and allowed to stand at this temperature so as to freeze out any water that remained, after which it was decanted from the ice crystals. A Dry Ice-acetone bath was used in cooling the butadiene to the foregoing temperature. The 1-butene was purified in a similar manner. The propylene was dried over silica-gel-alumina and calcium hydride prior to condensation in the stainless steel bomb.

The normal heptane was charged to the reactor first, followed by injection of the preformed catalyst. The temperature was then raised to 80° C. and the premixed monomers were pressured into the reactor. After a period of 16 hours, the reaction mixture was transferred to a stainless steel pot which contained phenyl-beta-naphthylamine, toluene, and isopropanol as a combined antioxidant and shortstop solution. The polymer was coagulated in isopropanol and dried under vacuum. A very tacky product was obtained which upon analysis was found to have the following properties:

| | |
|---|---|
| Inherent viscosity [1] | 0.93 |
| Gel, percent [2] | 33 |
| Swelling index | 1 |
| Unsaturation, percent [3] | 6 |

[1] Determined by method of Kemp et al., Ind. & Eng. Chem. 35, 1108 (1943).
[2] The gel was determined in toluene. Since toluene does not dissolve polymers of this type as well as does cyclohexane, the value for gel content is somewhat higher than would otherwise be obtained.
[3] Determined by the chemical method using iodine monochloride. According to this method, 0.2 gram of polymer, free from phenyl-beta-naphthylamine, was added to about 180 ml. of a 3 to 1 by volume carbon disulfide-chloroform solution in a 250 milliliter volumetric flask. The mixture was allowed to stand in the dark at room temperature until the polymer dissolved. The flask was then placed in a constant temperature bath at 25° C. and allowed to stand until the solution reached this temperature. A measured amount of an excess of iodine monochloride was added and the mixture was diluted to the mark with additional carbon-disulfide-chloroform solution and then allowed to stand in the 25° C. bath for one hour. The excess of iodine monochloride was titrated with 0.05 N sodium thiosulfate, and the amount of iodine monochloride was calculated to determine the unsaturation. A control (blank) was run in which all ingredients except the polymer were used.

A 5 to 10 weight percent solution of the portion of the polymer soluble in cyclohexane was prepared and applied with a brush to two types of backing films, namely, a polyvinyl chloride film and a high density polyethylene film. In each instance, the tapes had a width of ¾″. The tapes were then dried in a vacuum over at about 60° C. after which they were pressed with the thumb to various surfaces. Thus, both types of tape were pressed onto painted wood while the polyvinyl chloride tape was also tested for adherence to polished aluminum, glass and paper. Two commercial tapes, namely, Scotch Cellophane and Scotch Electrical, having a similar width were used for comparative purposes. In order to evaluate the bond, the tape, after being pressed onto the surface to be tested, was attached to a string which passed through a pulley and was then fastened to a balance pan. Weights were then placed on the pan until the tape was torn loose. The weight necessary to pull the tape loose from the surface at a constant rate was used as the basis for measuring its effectiveness and for comparing it with the commercial tapes. The results of these tests are shown hereinbelow in the table.

Table

| Tape Material | Grams Required to Pull Tape from Surface | | | |
|---|---|---|---|---|
| | Painted Wood | Polished Aluminum | Glass | Paper |
| Polyvinyl chloride | 1,000 | 1,100 | 1,300 | 900 |
| Polyethylene | 900 | | | |
| Scotch Cellophane | 1,200 | 1,000 | 300 | 900 |
| Scotch Electrical | 1,000 | 800 | 600 | 900 |

In the case of the pressure-sensitive adhesive tapes of this invention, the terpolymer adhesive pulled away from the backing material rather than from the wood, aluminum, glass or paper surfaces. The reverse was true in the case of the commercial tapes. The data in the foregoing table show that the terpolymer adhesive forms a strong bond with the several surfaces to which the tape was applied. In many instances, the bond was much stronger than that obtained with commercial tapes.

As will be evident to those skilled in the art, many variations and modifications of this invention can be practiced in view of the foregoing disclosure. Such variations and modifications are clearly believed to come within the spirit and scope of the invention.

I claim:

1. A process for preparing terpolymers which comprises contacting under polymerization conditions an olefinic mixture comprising 35 to 55 parts by weight of propylene, 35 to 55 parts by weight of a straight chain 1-olefin containing from 4 to 6, inclusive, carbon atoms per molecule and 5 to 15 parts by weight of conjugated diene selected from the group consisting of 1,3-butadiene, isoprene and 1,3-pentadiene, based on 100 parts by weight of the total olefinic mixture, with a catalyst comprising a compound corresponding to the formula $R_3Al$, wherein R is an alkyl radical containing from 1 to 12, inclusive, carbon atoms, and titanium tetrachloride.

2. A process for preparing terpolymers which comprises polymerizing an olefinic mixture comprising 35 to 55 parts by weight to propylene, 35 to 55 parts by weight of a straight chain 1-olefin containing from 4 to 6, inclusive, carbon atoms per molecule and 5 to 15 parts by weight of a conjugated diene selected from the group consisting of 1,3-butadiene, isoprene and 1,3-pentadiene, based on 100 parts by weight of the total olefin mixture, in the presence of a catalyst comprising in the range of 0.8 to 3 mols of a compound corresponding to the formula $R_3Al$, wherein R is an alkyl radical containing from 1 to 12, inclusive, carbon atoms, per mol of titanium tetrachloride, and said catalyst containing from 3 to 30 millimoles of said $R_3Al$ compound per 100 grams of said olefinic mixture, at a temperature in the range of zero to 150° C., in the presence of a hydrocarbon diluent, and at a pressure sufficient to maintain said diluent in liquid phase; and recovering the terpolymer so prepared.

3. The process according to claim 2 in which said olefinic mixture comprises propylene, 1-butene and 1,3-butadiene.

4. The process according to claim 3 in which said catalyst consists essentially of tributylaluminum and titanium tetrachloride.

5. The process according to claim 2 in which the ratio of the amounts of said $R_3Al$ compound and titanium tetrachloride in said catalyst is in the range of 0.8 to 2 mols of said $R_3Al$ compound per mol of said titanium tetrachloride.

6. A terpolymer formed by the process of claim 1.

7. A terpolymer formed by the process of claim 3.

8. A pressure-sensitive adhesive tape comprising a backing material and a coating of the terpolymer of claim 6.

9. A pressure-sensitive adhesive tape comprising a backing material and a coating of the terpolymer of claim 7.

References Cited by the Examiner
UNITED STATES PATENTS

| | | | |
|---|---|---|---|
| 2,576,968 | 12/51 | Pike et al. | 117—122 |
| 2,846,427 | 8/58 | Findlay | 260—94.3 |
| 2,882,264 | 4/59 | Barnes et al. | 260—94.3 |
| 2,905,659 | 9/59 | Miller et al. | 260—94.3 |
| 3,058,971 | 10/62 | Miller et al. | 260—85.3 |

JOSEPH L. SCHOFER, *Primary Examiner.*

DONALD ARNOLD, L. H. GASTON, *Examiners.*